United States Patent Office 3,256,254
Patented June 14, 1966

3,256,254
OXYCARBOCYCLIC ESTER COMPOSITIONS CONTAINING ARYL PEROXIDES AND TERTIARY AROMATIC AMINES, POLYMERIZABLE IN AIR
Heinz F. Reinhardt, Claymont, Del., assignor to E. I. du Pont de Nemours and Company, Wilmington, Del., a corporation of Delaware
No Drawing. Filed Aug. 28, 1962, Ser. No. 220,056
30 Claims. (Cl. 260—86.1)

This invention relates to a new class of casting compositions based on acrylic esters of certain oxycarbocyclic-substituted alkanols combined with certain initiators and accelerators. It further relates to such compositions in which the initiators are aryl peroxides and the accelerators are certain classes of tertiary aromatic amines.

Rapid polymerization of acrylate or methacrylate esters at room temperature, in the past has required adherence to one or both of the following limitations: either the polymerization be carried out in the absence of air or that a polymer syrup (i.e., partially polymerized material) be used. The former limitation requires casting in closed molds or use of an inert atmosphere. On the other hand, polymer syrups (either partially polymerized material or polymer solutions in monomer) are generally quite viscous and special techniques must be used to eliminate trapped air from potted, cast or coated objects. Air entrapment can be troublesome, with complicated shapes, where the working life of the potting composition is short and the amount of entrapped air is high, or with deep shapes, where the time of rising of air bubbles through the viscous composition is long. Conventional initiating systems, such as the cobalt/peroxide types, not only are slow to effect cure of acrylate compositions (from 2 to 24 hours or more at room temperature), but the cobalt portion imparts a dark color and can interfere with the aging stability and electrical properties of the cured material.

It has been found that compositions containing (a) monomeric acrylate and methacrylate esters of certain 5 and 6 membered ring, oxycarbocyclic alkanols having a hydrogen α to the ring oxygen, as the primary polymerizate and (b) aryl peroxides with (c) certain aryl tertiary amines as the initiator and accelerator, undergo rapid polymerization in the presence of air and without the necessity of prior preparation of polymer syrups.

The compositions of this invention comprise, more specifically:

(a) At least one ester of a $C_3$–$C_4$ α,β-unsaturated carboxylic acid and an alkanol selected from the class consisting of substituted alkanols bearing an oxycarbocyclic radical having from 5 to 6 atoms in the ring and having a hydrogen atom on a carbon atom adjacent to the ring oxygen atom, and dissolved in said ester;
(b) 0.01% to 3.0% by weight of said ester, of an aryl peroxy initiator compound; and
(c) 0.01% to 1.0% by weight of said ester of an aryl alkyl tertiary amine compound having at least one hydrogen atom on the first carbon atom of an alkyl radical attached to the nitrogen atom of said amine.

Representative oxycarbocyclic alkanols from which the esters of the above invention are made are shown by those compounds having the following structural formulas:

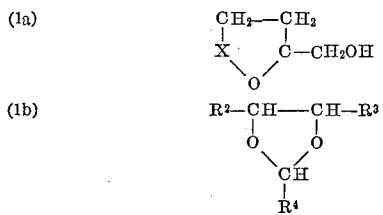

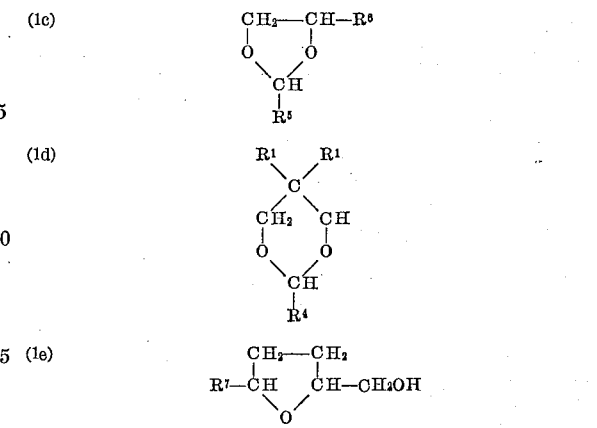

wherein:

$X$—$O$ is a —$CH_2$—$CH_2$—$O$—, —$CHCH_3CH_2$—$O$—, —$CH=CH$—$O$— or —$CCH_3=CH$—$O$— radical;
$R^1$ is a hydrogen or methyl radical;
$R^2$ is a hydrogen, methyl, ethyl, vinyl or isopropenyl radical;
$R^3$ is a hydrogen, $C_1$–$C_9$ alkyl, vinyl, propenyl, isopropenyl, phenyl or furyl-2 radical;
$R^4$ is a propylol or butylol radical;
$R^5$ is a radical of the class defined under $R^3$ or $R^4$ or is a 3,4-dihydropyran-2-yl or furyl-2-vinyl radical;
$R^6$ is a $C_1$–$C_9$ alkylol or allyloxymethyl radical such that at least one of $R^5$ and $R^6$ is an alkylol radical;
$R^7$ is a hydrogen or methylol radical.

These alkanols can be prepared by known processes in the art and contain on the oxycarbocyclic radical a hydrogen on a carbon atom adjacent to the ring oxygen atom. In the case of the dioxolanes and dioxanes, two such hydrogen atoms are present. These alkanols are converted into the esters by transesterification procedures, such as are shown in U.S. 2,433,866, U.S. 2,229,997 and U.S. 2,654,717. Some of the alkanols of Formula 1c are diffunctional and thus can be used to produce diacrylates and dimethacrylates.

The substituents listed for the definitions of $R_3$ and $R_6$ include such $C_1$–$C_9$ alkyl groups as methyl, ethyl, propyl, butyl, hexyl, heptyl, octyl and nonyl as well as $C_1$–$C_9$ alkylol groups, such as methylol, ethylol, propylol, butylol, hexylol, octylol and nonylol.

The aryl peroxy compounds of this invention are preferably aryl peroxides such as:

Benzoyl peroxide
p-Methylbenzoyl peroxide
p-Methoxybenzoyl peroxide
p-Nitrobenzoyl peroxide
2,4-dichlorobenzoyl peroxide
p-Chlorobenzoyl peroxide
m-Chlorobenzoyl peroxide
p-Monomethoxybenzoyl peroxide They can be used from about 0.01% to 3.0% of the weight of the acrylic ester and preferably from about 0.5% to 1.5%.

The aryl alkyl tertiary amines of this invention have at least one hydrogen on the first carbon atom of an alkyl radical attached to the amine nitrogen as exemplified by such compounds as:

N,N-dimethyl aniline
N,N-diisopropyl aniline
N,N-diethyl aniline
N-ethyl-N-isopropyl aniline
N-methyl diphenylamine Diphenyl benzylamine
N,N-dimethyl-p-toluidine
N,N-dimethyl-m-toluidine
N,N-diethyl-p-toluidine
N,N-diisopropylol-p-toluidine
N,N-diethanol-p-toluidine
N,N-diethylol aniline
N-ethyl-N-ethylol aniline
p,p'-Di(diethanolamino)diphenylmethane
p,p'-Di(diisopropylolamino)diphenylmethane
p,p',p''-tri(ethanolamino)triphenylmethane
N,N-dimethyl biphenylamine
N,N-dimethyl naphthylamine
N,N-dimethyl xylylidine
N,N-diethyl xylylidine Preferably compounds with only one aryl ring on the amine nitrogen are used and more preferably are those with one aryl ring and two alkylol radicals attached to the amine nitrogen because of their speed of reaction and low color. Tertiary amines having neither an aryl ring nor a hydrogen on the first carbon atom of an alkyl radical on the hydrogen atom of the amine radical are compounds not having significant accelerating activity for the ester compositions of this invention. Thus, triaryl amines, tertiary alkyl aryl tertiary amines and arylcycloalkyl or arylheterocyclo tertiary amines are either not active or of too low activity to be of practical use.

The aryl alkyl tertiary amines above can be used in the range of about 0.01% to 1.0% by weight of the ester and preferably in the range of about 0.05% to 0.50% by weight.

Though the compositions of this invention contain acrylic esters of certain oxycarbocyclic alkanols as the essential polymerizing monomer, other copolymerizable monomers can be effectively combined with them, preferably in the range of about 0% to 50%, to modify the physical and electrical properties of the final cured compound. Further, though these compositions are designed primarily to take advantage of the low viscosity of their monomeric components, other materials, such as partially or fully polymerized acrylic polymers, can be dissolved therein before curing to further modify the physical properties of the cured product.

The compositions of this invention are useful as potting and casting compositions for electrical and similar materials because of their low viscosity and rapid hard setting with tack-free surface in the presence of air. Many of these compositions will harden starting at room temperature in 8 to 12 minutes' time to a solid, tack-free surface. Some will begin to gel within 2 to 3 minutes' time, and are fully hard on cooling off the heat developed by the exothermic reaction. With such rapid-setting compositions, provisions for cooling during the exotherm are desirable.

The presence of an oxycarbocyclic ring in these compositions generally favors their having high adhesion to metals. Other adhesion-promoting groups can also be combined in these compositions by including unsaturated carboxylic compounds, such as acrylic acid, methacrylic acid or maleic anhydride and their polymers and copolymers or by the acrylates or methacrylates of hydroxy aminopropanol and their polymers and copolymers.

The following examples, in which parts are shown by weight, further illustrate the compositions of this invention.

Example I

In 15 parts of 3,4-dihydropyran-2-methyl methacrylate (DHPM) is dissolved 0.25 part of benzoyl peroxide. In a separate 10-part portion of DHPM is dissolved 0.05 part of di(isopropylol)-p-toluidine. The above two solutions are then mixed rapidly, preferably within 2 minutes at room temperature, and then poured as rapidly as possible into an open metal mold. After about 3 minutes, the composition begins to exotherm and increases in viscosity. In about 7 to 10 minutes' time, the composition sets to a soft, rubbery, tack-free gel, which on cooling and aging becomes a tough, hard, transparent, nearly colorless casting. Essentially equivalent results are obtained by replacing the DHPM above with an equal amount of 5-methyl-3,4-dihydropyran-2-methyl methacrylate or of 5-methyl-3,4-dihydropyran-2-methyl acrylate.

Example II

A repeat of Example I is made in which 5 parts of 2-vinyl-1,3-dioxolane-2-butyl methacrylate are added to the 15 parts of DHPM. A rapid-setting casting composition is obtained and is poured about ¼" deep in an open metal mold and allowed to cure.

Example III

A repeat of Example I is made in which 10 parts of butyl acrylate monomer and 0.20 part of benzoyl peroxide are added to the 15 parts of DHPM. A rapid-setting casting composition is obtained and is poured about ¼" deep in an open metal mold and allowed to cure.

Examples IV–IX

Example I is repeated, using 25 parts of the following monomers to replace the 25 parts of DHPM. Approximate tack-free setting times of the compositions are noted when poured about ¼" deep in an open metal mold.

| Example | | Minutes Setting Time |
|---|---|---|
| IV | 1,3-dioxolane-2-butyl methacrylate | 10 |
| V | 2-propyl-1,3-dioxolane-4-ethyl methacrylate | 15–20 |
| VI | 4,5-divinyl-1,3-dioxolane-2-butyl methacrylate | 8–10 |
| VII | 2-vinyl-1,3-dioxolane-4-methyl methacrylate | 10–15 |
| VIII | 2-vinyl-1,3-dioxolane-4-butyl methacrylate | 10–15 |
| IX | 5,5-dimethyl-1,3-dioxane-4-butyl methacrylate | 15–20 |

In comparison to the rapid setup of the above six compositions, control compositions not part of this invention are prepared by replacing the 15 parts of DHPM of Example I with 25 parts in turn of each of butyl acrylate, methyl methacrylate and polyethylene glycol 300 diacrylate. No exotherm or increase in viscosity of these control compositions occurs in up to 24 hours in air, although some brownish discoloration develops.

Example X

Example I is repeated, using 25 parts of the following monomers, one at a time, to replace the 25 parts of DHPM. Rapid polymerization and tack-free setup is obtained when the compositions are placed in open molds.

Diacrylate of 2-butylol-1,3-dioxolane-4-methanol
Diacrylate of 2-propylol-1,3-dioxolane-4-methanol
Diacrylate of 2-propylol-1,3-dioxolane-4-butanol
Dimethacrylate of 2-propylol-1,3-dioxolane-4-butanol
Dimethacrylate of 2-butylol-1,3-dioxolane-4-ethylol
Dimethacrylate of 2-butylol-1,3-dioxolane-4-butanol
1,3-dioxolane-4-methyl methacrylate
1,3-dioxolane-4-methyl acrylate
1,3-dioxolane-4-ethyl acrylate
1,3-dioxolane-4-ethyl methacrylate
1,3-dioxolane-4-proyl methacrylate
1,3-dioxolane-4-butyl methacrylate
1,3-dioxolane-2-butyl acrylate
1,3-dioxolane-2-propyl methacrylate
2-heptyl-1,3-dioxolane-4-methyl methacrylate
2-vinyl-1,3-dioxolane-4-ethyl methacrylate
2-vinyl-1,3-dioxolane-4-propyl methacrylate
2-vinyl-1,3-dioxolane-4-butyl acrylate
2-propenyl-1,3-dioxolane-4-butyl acrylate
2-isopropenyl-1,3-dioxolane-4-methyl acrylate
4-vinyl-1,3-dioxolane-2-butyl methacrylate
5-methyltetrahydropyran-2-methyl methacrylate
Tetrahydropyran-2-methyl methacrylate
4-vinyl-1,3-dioxolane-2-propyl acrylate 4-phenyl-1,3-dioxolane-2-butyl methacrylate
4,5-diisopropenyl-1,3-dioxolane-2-butyl methacrylate
4,5-diethyl-1,3-dioxolane-2-butyl methacrylate
4,5-diethyl-1,3-dioxolane-2-propyl acrylate
4-allyloxymethyl-1,3-dioxolane-2-propyl methacrylate
4-allyloxymethyl-1,3-dioxolane-2-butyl methacrylate
2(3,4-dihydropyran-2-yl)-1,3-dioxolane-4-methyl methacrylate
2(fur-2-ylvinyl)-1,3-dioxolane-4-butyl methacrylate
4-vinyl-5-furyl-1,3-dioxolane-2-butyl acrylate
1,3-dioxane-2-butyl methacrylate
1,3-dioxane-2-butyl acrylate
1,3-dioxane-2-propyl acrylate
5,5-dimethyl-1,3-dioxane-2-propyl acrylate
Diacrylate of 2,5-dimethylol tetrahydrofuran
Tetrahydrofurfuryl acrylate
Tetrahydrofurfuryl methacrylate In the above example various acrylate and methacrylate esters are shown as illustration, and other combinations of these substituent groups within the scope of this invention will occur to those skilled in the art. Substantially similar results are obtained above when acrylate esters are replaced by the analogous methacrylate esters and vice versa.

In the above examples other aryl alkyl tertiary amines can be substituted for the diisopropyl-p-toluidine of Example I; and other aryl peroxides can be substituted for the benzoyl peroxide to produce casting compositions that will cure in open molds.

Though metal molds are easiest to use because of rapid heat dissipation, other mold materials can be used, such as paper, wood, plastic, coated fabric, glass, etc. Various materials can be embedded in these casting compositions for decorative, display or preservation purposes; such as coins, shells, wooden articles and biological specimens. The compositions can also be used for electrical and dental purposes.

*Example XI*

Example I is repeated, using 10 parts of methyl methacrylate to replace the 10-part portion of DHPM. The composition is poured into an open mold where it sets soft in about 50 minutes, and is hard and track-free in about 1 hour. A transparent, light yellow, hard casting results. Similar results are obtained by replacing the methyl methacrylate by other monomers, such as ethyl acrylate, isobutyl methacrylate, glycidyl methacrylate and acrylonitrile. Generally, the presence of the non-oxycarbocyclic monomers slows down the curing rate of the compositions of this invention.

I claim:
1. A polymerizable composition, stable in the absence of air, consisting essentially of:
   (a) at least one ester of a $C_3$–$C_4$ α,β-unsaturated carboxylic acid and an alkanol selected from the class of substituted alkanols bearing an oxycarbocyclic radical having from 5 to 6 members in the ring of said radical and having a hydrogen on a carbon atom adjacent to the ring oxygen atom; and dissolved in said ester;
   (b) 0.01% to 3.0% by weight of said ester of an aryl organic peroxy initiator compound; and
   (c) from about 0.01% to 1.0% of an aryl alkyl tertiary amine accelerator compound having at least one hydrogen atom on the first carbon atom of the alkyl group attached to the nitrogen atom of said amine.
2. A composition of claim 1 in which the ester is an ester of an oxycarbocyclic alkanol selected from the class represented by the following structural formulas:

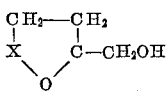 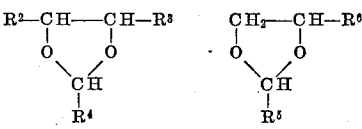 and

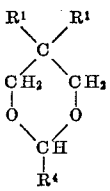 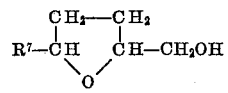

wherein:
X—O is selected from the class consisting of
—$CH_2$—$CH_2$—O—, —$CHCH_3$—$CH_2$—O—,
—CH=CH—O—, and —$CCH_3$=CH—O—;
$R^1$ is selected from the class consisting of H and $CH_3$—;
$R^2$ is selected from the class consisting of H, $CH_3$, $C_2H_5$, $CH_2$=CH— and $$CH_2\overset{|}{C}=CH$$

$R^3$ is selected from the class consisting of H, $C_1$–$C_9$ alkyl, $CH_2$=CH—, $CH_3CH$=CH—, $$CH_3-\overset{|}{C}=CH_2$$

phenyl and furyl-2;
$R^4$ is a $C_1$–$C_9$ alkylol radical;
$R^5$ is selected from the class consisting of $R^3$ and $R^4$ as as before defined, and 3,4-dihydropyran-2-yl and furyl-2-vinyl radicals;
$R^6$ is selected from the class consisting of $C_1$–$C_9$ alkylol and allyloxymethyl radicals so that at least one of $R^5$ and $R^6$ is an alkylol radical;
$R^7$ is selected from the class consisting of hydrogen and a methylol.

3. A composition of claim 1 in which the ester is an ester of said alkanols and acrylic acid.
4. A composition of claim 1 in which the ester is an ester of said alkanols and methacrylic acid.
5. A composition of claim 1 in which the ester is an ester of 3,4-dihydropyran-2-methanol.
6. A composition of claim 2 in which the ester is an ester of a 1,3-dioxolane-2-propanol having at least one hydrogen atom on each of the carbon atoms in the 4 and 5 positions of the ring and bearing substituents $R^2$ and $R^3$ respectively as before defined.
7. A composition of claim 2 in which the ester is an ester of a 1,3-dioxolane-2-butanol having at least one hydrogen atom on each of the carbon atoms in the 4 and 5 positions of the ring and bearing substituents $R^2$ and $R^3$ respectively as before defined.
8. A composition of claim 1 in which the ester is an ester of a 1,3-dioxane-2-propanol.
9. A composition of claim 1 in which the ester is an ester of a 1,3-dioxane-2-butanol.
10. A composition of claim 1 in which the ester is an ester of a 1,3-dioxolane-2-propanol bearing a $C_1$–$C_9$ alkylol radical on the carbon atom in the 4 position of the ring.
11. A composition of claim 1 in which the ester is an ester of a 1,3-dioxolane-2-butanol bearing a $C_1$–$C_9$ alkylol radical on the carbon atom in the 4 position of the ring.
12. A composition of claim 1 in which the ester is 3,4-dihydropyran-2-methyl methacrylate.
13. A composition of claim 1 in which the ester is 1,3-dioxolane-2-butyl methacrylate.
14. A composition of claim 1 in which the ester is 2-propyl-1,3-dioxolane-4-ethyl methacrylate.
15. A composition of claim 1 in which the ester is 4,5-divinyl-1,3-dioxolane-2-butyl methacrylate.
16. A composition of claim 1 in which the ester is 2-vinyl-1,3-dioxolane-4-methyl methacrylate.
17. A composition of claim 1 in which the ester is 2-vinyl-1,3-dioxolane-4-butyl methacrylate.
18. A composition of claim 1 in which the ester is 5,5-dimethyl-1,3-dioxane-2-butyl methacrylate.

19. A composition of claim 1 in which the ester is 4-vinyl-1,3-dioxolane-2-butyl methacrylate.

20. A composition of claim 1 in which the ester is 2-vinyl-1,3-dioxolane-4-ethyl methacrylate.

21. A composition of claim 1 in which the ester is 1,3-dioxolane-4-methyl methacrylate.

22. A composition of claim 1 in which the ester is 1,3-dioxolane-4-butyl methacrylate.

23. A composition of claim 1 in which the ester is 1,3-dioxane-2-butyl methacrylate.

24. A composition of claim 1 in which the ester is 2-isopropenyl-1,3-dioxolane-4-methyl acrylate.

25. A composition of claim 1 in which the ester is a diacrylate of 2,5-dimethylol tetrahydrofuran.

26. A composition of claim 1 in which the ester is tetrahydrofurfuryl acrylate.

27. A composition of claim 1 in which the ester is tetrahydropyran-2-methyl methacrylate.

28. A composition of claim 1 which consists of said ester and at least one other copolymerizable monomer.

29. A method for enhancing the polymerization speed of a composition having as a primary polymerizate at least one ester of a $C_3$–$C_4$ $\alpha,\beta$ unsaturated carboxylic acid and an alkanol selected from the class of substituted alkanols bearing an oxycarbocyclic radical having from 5 to 6 members in the ring of said radical and having a hydrogen on a carbon atom adjacent to the ring oxygen atom, said method comprising conducting the polymerization of said composition in the presence of from 0.01% to 3.0%, by weight of said ester, of an aryl organic peroxy initiator compound and from 0.01% to 1.0% of an aryl alkyl tertiary amine accelerator compound having at least one hydrogen atom on the first carbon atom of the alkyl group attached to the nitrogen atom of said amine.

30. In a method for polymerizing a composition having as a primary polymerizate at least one ester of a $C_3$–$C_4$ $\alpha,\beta$ unsaturated carboxylic acid and an alkanol selected from the class of substituted alkanols bearing an oxycarbocyclic radical having from 5 to 6 members in the ring of said radical and having a hydrogen on a carbon atom adjacent to the ring oxygen atom, and containing from 0.01% to 3.0%, by weight of said ester, of an aryl organic peroxy compound as an initiator, the improvement comprising conducting said polymerization in the presence of from 0.01% to 1% of an aryl alkyl tertiary amine having at least one hydrogen atom on the first carbon atom of the alkyl group attached to the nitrogen atom of said amine.

References Cited by the Examiner

UNITED STATES PATENTS

| | | | |
|---|---|---|---|
| 2,229,997 | 1/1941 | Claborn | 260—88.5 |
| 2,433,866 | 1/1948 | Rehberg et al. | 260—88.5 |
| 2,559,345 | 7/1951 | Church et al. | 260—89.5 |
| 2,680,735 | 6/1954 | Fegley et al. | 260—88.3 |
| 2,987,500 | 6/1961 | Rossetti | 260—89.5 |
| 3,041,322 | 6/1962 | Krieble | 260—89.5 |

JOSEPH L. SCHOFER, *Primary Examiner.*

DONALD E. CZAJA, *Examiner.*

HARRY WONG, *Assistant Examiner.*